United States Patent [19]

Sawlsville

[11] 4,251,943
[45] Feb. 24, 1981

[54] COLLAPSIBLE, WATER-PERMEABLE, PORTABLE FISH TRAP

[76] Inventor: Ed Sawlsville, 9604 Ruffner St., Sepulveda, Calif. 91343

[21] Appl. No.: 1,672

[22] Filed: Jan. 8, 1979

[51] Int. Cl.³ .............................................. A01K 97/04
[52] U.S. Cl. ....................................................... 43/55
[58] Field of Search ..................... 43/55, 56, 103, 104, 43/105, 17.5; 9/8 R, 8.3 R, 8.3 E, 11 R, 340, 345

[56] References Cited

U.S. PATENT DOCUMENTS

| | | | |
|---|---|---|---|
| 714,757 | 12/1902 | Strakele | 9/11 R |
| 1,140,358 | 5/1915 | Cleave | 9/340 |
| 1,841,956 | 1/1932 | Juergens | 43/55 |
| 2,109,813 | 3/1938 | Winckler | 9/8.3 E |
| 3,037,217 | 6/1962 | Mandra | 9/8.3 R X |
| 3,182,340 | 5/1965 | Gentile | 9/8 R |
| 3,381,408 | 5/1968 | Nishimura | 43/55 |
| 3,478,463 | 11/1969 | Ruter | 43/55 |
| 3,524,278 | 8/1970 | Wolfe | 43/55 |
| 3,919,803 | 11/1975 | Manguso | 43/55 |

FOREIGN PATENT DOCUMENTS

| | | | |
|---|---|---|---|
| 447213 | 4/1912 | France | 9/345 |
| 1089149 | 11/1967 | United Kingdom | 43/55 |

*Primary Examiner*—Nicholas P. Godici
*Attorney, Agent, or Firm*—John J. Posta, Jr.

[57] ABSTRACT

The improvements in a collapsible fish trap of the present invention include a flotation collar releasably secured around the flared neck of the trap above the fish-holding chamber in the trap, as by latch means in the form of one or more pins and rotatable latch arms. The collar maintains the neck in an uncollapsed, fully open state with the upper open end of the trap adjacent to the surface of water when the trap is immersed therein. This provides convenient access to the holding chamber. Moreover, the collar prevents loss of the trap and fish therein by sinking. In one embodiment, the collar is of soft resilient foamed elastomer. It can also be formed of hard foamed plastic segments, cork or the like, or can be in the form of an inflatable expandable doughnut. The float may include trap-locating means, such as a brightly colored surface layer, which may also be fluorescent or phosphorescent, to facilitate the recovery of the trap should it slip its moorings. The locating means may include light reflecting means such as reflector buttons on the surface layer, and/or light-emitting means such as flash-lights releasably disposable in pockets in the float. The improved trap thus is easier to handle and locate in use and yet is inexpensive, the collar with or without locating means being of relatively low cost and high durability.

14 Claims, 3 Drawing Figures

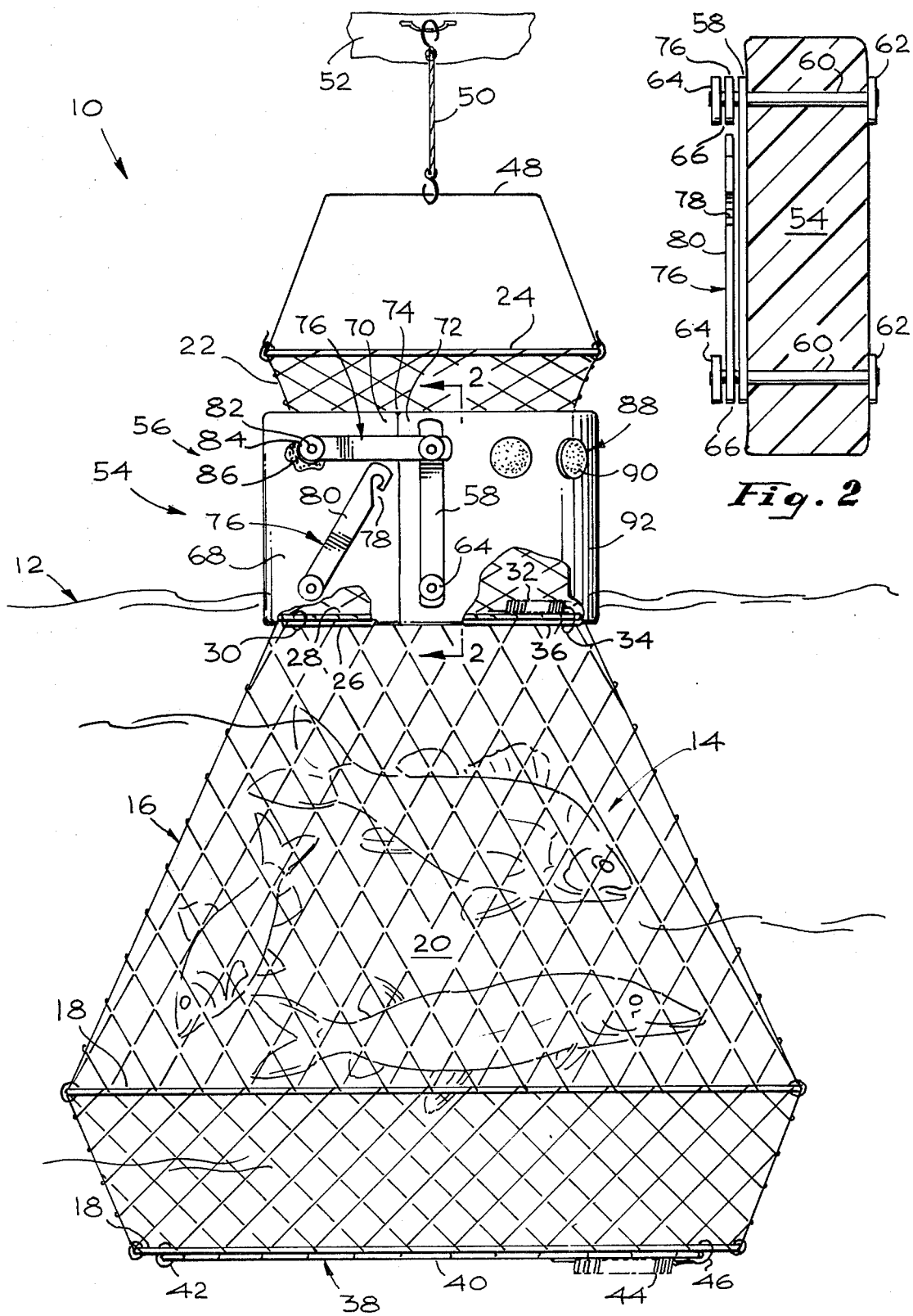

COLLAPSIBLE, WATER-PERMEABLE, PORTABLE FISH TRAP

BACKGROUND OF THE INVENTION

1. Field of the Invention

The present invention generally relates to fish holding means and more particularly to improvements in collapsible fish traps and the like.

2. Prior Art

Collapsible fish traps or pens are utilized to keep fish in an alive and unimpaired state until used, either as bait or as food, etc. Collapsible traps are characterized by a wire chain or mesh construction reinforced with metal rings and defining a central fish-holding chamber with access thereto through a collapsible neck portion with an open upper end above the chamber. Usually a trap door is disposed at the bottom of the neck to prevent the trapped fish from swimming up and out of the chamber into, up and out of the neck. When the trap is hung in the water from the side of a boat or dock, the trap is mainly in the uncollapsed state. However, wave action, handling during insertion of a fish into the trap through the neck, etc. can cause the neck to partially collapse, making the trap difficult to handle and restricting the opening at the trap's upper end. Moreover, the trap can hang so far into the water that the trap door at the bottom of the neck may be difficult to reach to open in order to gain access to the fish holding chamber. In addition, if the trap while in the water inadvertently becomes detached from its mooring at the dock or boat, it will sink out of sight and be lost, together with the fish trapped therein which then die in an inhumane manner.

Accordingly, it would be desirable to provide improvements in collapsible fish traps which would prevent loss of the traps by sinking or otherwise, and which also would increase the ease and convenience of use of the traps.

SUMMARY OF THE INVENTION

The foregoing needs have been satisfied by the improvements of the present invention in collapsible traps. The improvements are substantially as set forth in the Abstract above. Traps incorporating the float collar of the present invention are easier to handle in the water, since their collapsible necks are kept in the uncollapsed and fully open condition at or near the surface of the water for easier access to the fish-holding chamber therein. Moreover, the collar prevents loss of the trap by sinking, and may also include means, such as brightly colored surfaces, reflectors and/or light emitters (flashlights and the like) which make recovery of the traps easier if and when they slip their moorings and float away.

The float can be easily placed around the neck and just as easily removed and substituted for by a new float, due to the novel latch means employed in the float. The float may be soft or hard foamed plastic, cork or the like, or can be an inflatable, preferably expandible balloon-like doughnut so that the extent of lift provided by the float can be easily adjusted to provide the necessary flotation. Further features are set forth in the following detailed description and accompanying drawings.

DRAWINGS

FIG. 1 is a schematic front elevation, partly broken away, of a first preferred embodiment of the improvements in a collapsible fish trap in accordance with the present invention, the trap being shown in water with fish held therein;

FIG. 2 is a schematic fragmentary cross-section taken along the section line 2—2 of FIG. 1, illustrating the novel latch means of the trap collar;

DETAILED DESCRIPTION

FIGS. 1 and 2

Figure 3:
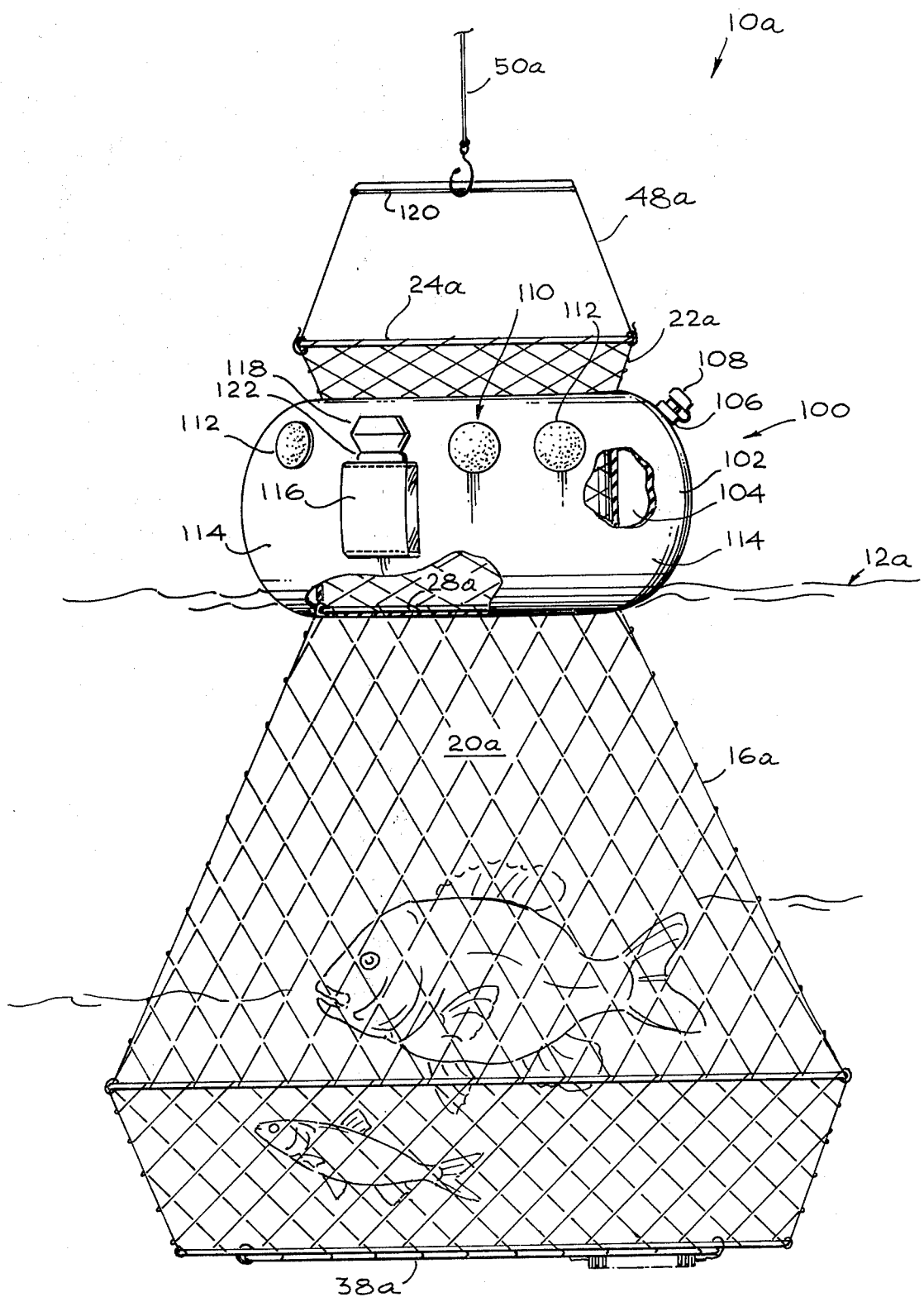
FIG. 3 is a schematic front elevation, partly broken away, of a second preferred embodiment of the improvements in a collapsible fish trap in accordance with the present invention, the trap being shown in use in the water.

Now referring more particularly to FIGS. 1 and 2 of the drawings, a first preferred embodiment of the present invention is schematically depicted therein. Thus, a collapsible fish trap 10 is schematically depicted suspended in water 12 and holding live fish 14 therein. Trap 10 is preferably bottle shaped and constructed to readily collapse into a small compact mass. Thus, it is constructed of wire mesh 16 of metal or the like, supported at intervals by about horizontal bands or rings 18 of metal or the like which may be hinged to the neck 16.

Trap 10 has a central holding chamber 20 within which fish 14 are disposed, and access to which is afforded by an upstanding neck 22 above chamber 20 and having an open upper end 24. The lower end 26 of neck 22 communicates with chamber 20 and within end 26 is disposed a horizontally extending top trapdoor 28 hinged at point 30 and releasably held shut by a spring 32 secured to door 28 and a hook 34, extending from spring 32 and releasably secured to a horizontal frame 36 surrounding door 28, as shown in FIG. 1.

Access to chamber 20 may also be had through a bottom trapdoor 38 therein set in a frame 40, hinged at point 42 and releasably held in place by a spring 44 and hook 46 extending from door 38 to frame 40. Trap 10 may include a handle 48 to which a mooring line 50 may be attached for mooring trap 10 to a boat or dock 52 or the like.

The described construction of trap 10 may be conventional. However, the use of a flotation collar therewith is novel. Thus, as shown in FIG. 1, an inexpensive, durable flotation collar 54 of soft polyurethane or other foam plastic, or the like, or natural or synthetic rubber or the like is shown disposed around neck 22. It will be noted that neck 22 is flared outwardly at its upper end 24 so that collar 54 is easily retained in the narrow portion of neck 22 between upper end 24 and lower end 26. Collar 54 is of sufficient size and thickness to prevent trap 10 from sinking out of sight in water 12 and being lost if mooring line 50 is inadvertently released from boat 52 (dock, etc.).

Collar 54 is releasably held in place around neck 22 by a novel inexpensive latch means 56 which can be made of metal, wood, plastic or the like and which includes a vertical plate 58 supporting a vertically spaced parallel pair of pins 60 (FIG. 2) extending horizontally front to back through collar 54 and held in place by a pair of rear discs 62 disposed behind collar 54 and by plate 58 in front of collar 54. A pair of front discs 64 are disposed at the front ends of pins 60, spaced forward of plate 58 to define latch-blade-receiving spaces 66 (FIG. 2).

Collar 54 is in the form of a sheet 68 disposed around neck 22 so that the ends 70 and 72 of sheet 68 meet at a vertical line 74. Plate 58, pins 60, and discs 62 and 64 are placed in end 72 on one side of line 74. A vertically spaced pair of rotatable latches 76 are aligned with pins 60 but are disposed in end 70 on the other side of line 74 a distance just sufficient to permit latches 76 to bridge ends 70 and 72 and releasably connect to (be received over) pins 60 in spaces 66 through notches 78 in latch blades 80 thereof. Blades 80 are secured to collar 54 by pins 82, secured by front discs 84 in front of collar 54 and rear discs 86 behind collar 54. Blades 80 rotate around pins 82.

Collar 54 also includes locating means 88 in the form of a plurality of light reflector buttons 90 disposed in the outer surface 92 thereof. Moreover, surface 92 is brightly colored, also to facilitate discovery and recovery of trap 10 in the water, should it slip its mooring and float away. Thus, collar 54 uniquely prevents loss of trap 10 by sinking, and permits its rapid location and recovery. Moreover, collar 54 holds neck 22 in the fully open uncollapsed upright condition to allow full and easy access to chamber 20 through trapdoor 28. Since trap 10 floats high in the water, due to collar 54, upper end 24 of neck 22 is within easy reach from a boat 52 or dock, etc. to facilitate use of trap 10.

FIG. 3

A second preferred embodiment of the present invention is schematically depicted in FIG. 3 of the drawings. Thus, trap 10a is shown disposed in water 12a. Trap 10a is in all respects identical to trap 10 except that collar 54 is substituted for by a neck collar 100 of a different type. Components of trap 10a identical to those of trap 10 bear the same numerals, but are succeeded by the letter "a". Thus, collar 100 is, as stated above, doughnut shaped and includes walls 102 defining an annular air space 104 which can be inflated by means of a nipple 106 defining a passageway (not shown) releasably sealed by a plug 108 and extending through a wall 102 into communication with space 104. Walls 102 may be formed of rubberized cloth, but preferably are formed of stretchable synthetic or natural rubber so that they can be expanded to substantially increase the size of collar 100 and thus, the buoyancy it provides to trap 10a. Blowing up collar 100 with air causes it to tighten around neck 22 to hold collar 100 firmly in place and keep neck 22a fully upright and open. Moreover, it displaces sufficient water 12a to cause trap 10a to float, with open end 24a of neck 22a easily accessible for conveniently placing fish into chamber 20a through neck 22a and trap door 28a.

Collar 100 also includes locating means 110 in the form of a plurality of reflector buttons 112 adhering to the outer surface 114 of wall 102. Moreover, surface 114 is brightly colored to contrast with water 12a and is phosphorescent. A pair of pockets 116 are also provided in wall 102 adjacent surface 114 on opposite sides of float 100, each pocket 116 releasably holding a separate light emitter such as a battery powered flashlight 118 or the like which, for example, can be constructed to operate only when crossbar 120 of handle 48a drops into contact with the casing 122 of flashlight 118, as when mooring line 50a is detached from its mooring.

Accordingly, trap 10a is provided with improved convenience and ease of handling as well as an assurance against sinking and improved locatability, all through the use of float collar 100. Thus, trap 10a is similar in advantages to trap 10.

Various other modifications, changes, alterations and additions can be made in the improvements of the present invention and in the components and parameters thereof. All such modifications, changes, alterations and additions as are within the scope of the appended claims form part of the present invention.

What is claimed is:

1. A floating, collapsible fish trap comprising, in combination:
   a. a collapsible, portable, water-permeable, non-floatable fish trap having an upper chamber and a lower chamber;
   b. a flotation means for preventing said fish trap from sinking and for maintaining said upper chamber in an uncollapsed position generally above the water line;
   c. said fish trap being collapsible into a compact, portable position when not in use;
   d. said upper chamber of said fish trap including an upper ring member and a lower ring member, with wire mesh interconnecting said upper ring member and lower ring member;
   e. said flotation means comprising a non-sinkable, circumferentially extending collar;
   f. said collar when in operative position having an internal diameter significantly smaller than the diameter of said upper ring member;
   g. said collar having a height which is substantially the same as the distance between the upper ring and lower ring when said fish trap is in an extended position;
   h. said collar, in operative position, being disposed between said upper ring and lower ring so as to compress the wire mesh therebetween and thereby maintain said collar between said upper and lower ring;
   i. whereby said combination provides a non-sinkable fish trap having an uncollapsed, defined upper chamber when in an operative position.

2. The improved trap of claim 1 wherein said trap is of wire mesh and includes an openable trapdoor disposed between said upper chamber and lower chamber.

3. The improved trap of claim 1 wherein said collar is releasably secured to the upper chamber of said fishtrap.

4. The improved trap of claim 1 wherein said collar comprises resilient foamed elastomer.

5. The improved trap of claim 1 wherein said collar is inflatable.

6. The improved trap of claim 5 wherein said collar comprises an expandable stretchable elastomer of doughnut shape.

7. The improved trap of claim 1 wherein said collar includes trap-locating means.

8. The improved trap of claim 7 wherein said locating means comprises a brightly colored surface layer on said float.

9. The improved trap of claim 8 wherein said surface layer is at least one of fluorescent and phosphorescent.

10. The improved trap of claim 7 wherein said locating means includes a light emitter.

11. The improved trap of claim 10 wherein said collar includes at least one pocket, and wherein each said pocket includes a removable flashlight.

12. The improved trap of claim 7 wherein said locating means includes a plurality of light reflectors disposed on the periphery of said collar.

13. The improved trap of claim 3 wherein said collar is split, and wherein latch means are disposed on said collar to fasten adjacent ends of said collar together, said latch means including a pin disposed in and protruding from the exterior of said collar adjacent one of said ends and a latch rotatably secured at the other said end adjacent said pin, bridging said ends and releasably received on said pin.

14. The improved trap of claim 13 wherein a spaced pair of said pins are disposed adjacent said one collar end and a spaced pair of said latches are disposed at said other sheet end adjacent said pins, which latches bridge said ends and are releasably secured to said pins.

* * * * *